Nov. 13, 1962 P. M. DAVIES 3,063,739
TRAILER FIFTH WHEEL COUPLINGS
Filed Sept. 2, 1958 8 Sheets-Sheet 1

*Inventor*
PHILIP M. DAVIES
By *Imirie & Smiley*
*Attorneys*

Nov. 13, 1962  P. M. DAVIES  3,063,739
TRAILER FIFTH WHEEL COUPLINGS
Filed Sept. 2, 1958  8 Sheets—Sheet 2

Inventor
PHILIP M. DAVIES
By *Imirie & Smiley*
Attorneys

Nov. 13, 1962 P. M. DAVIES 3,063,739
TRAILER FIFTH WHEEL COUPLINGS
Filed Sept. 2, 1958 8 Sheets-Sheet 3

Inventor
PHILIP M. DAVIES
By *Imirie & Smiley*
Attorneys

Nov. 13, 1962  P. M. DAVIES  3,063,739
TRAILER FIFTH-WHEEL COUPLINGS
Filed Sept. 2, 1958  8 Sheets-Sheet 4
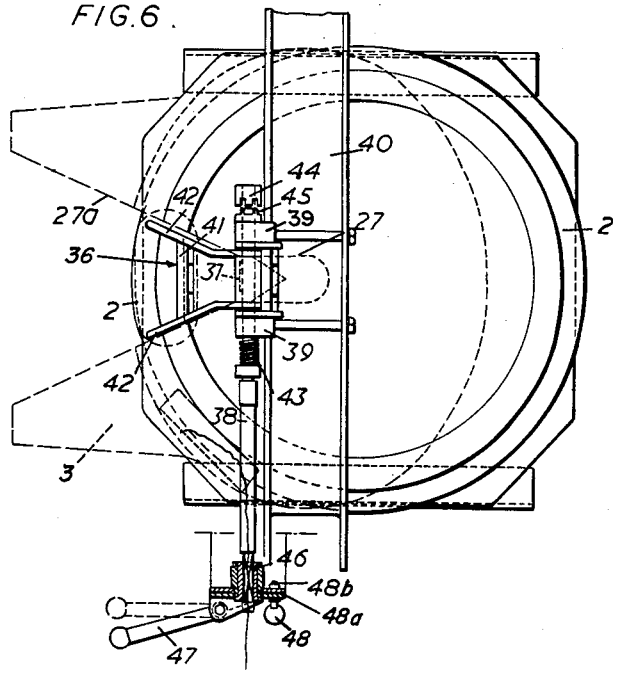
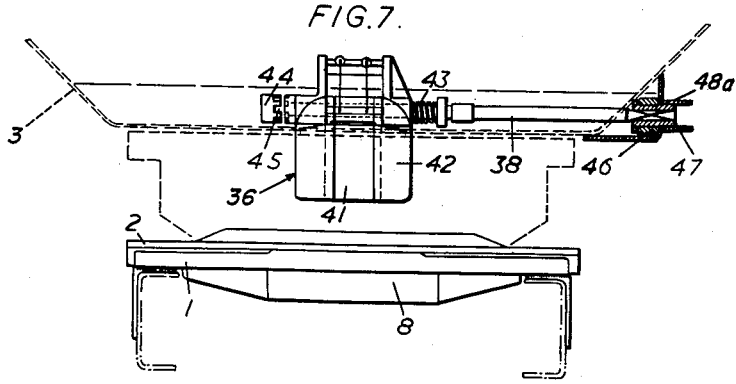
*Inventor*
PHILIP M. DAVIES
By
*Attorneys*

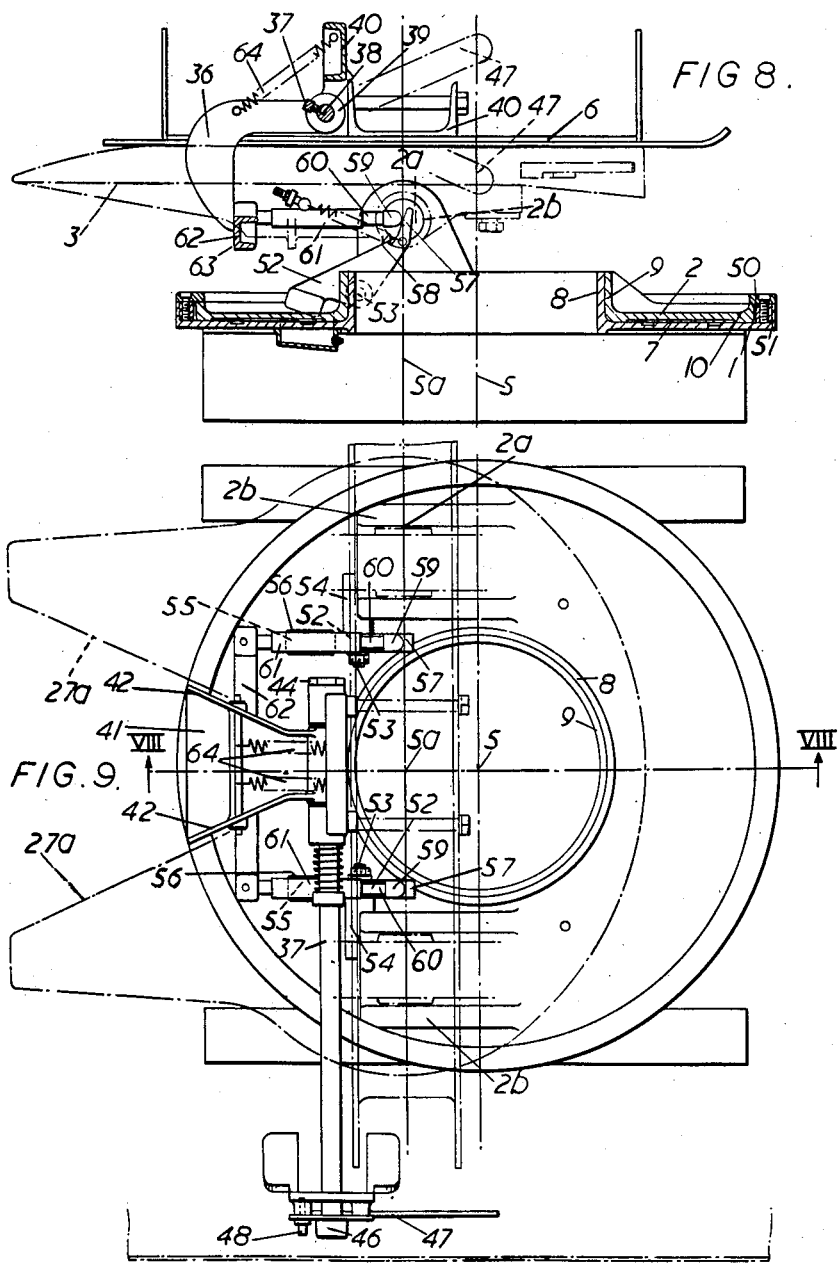

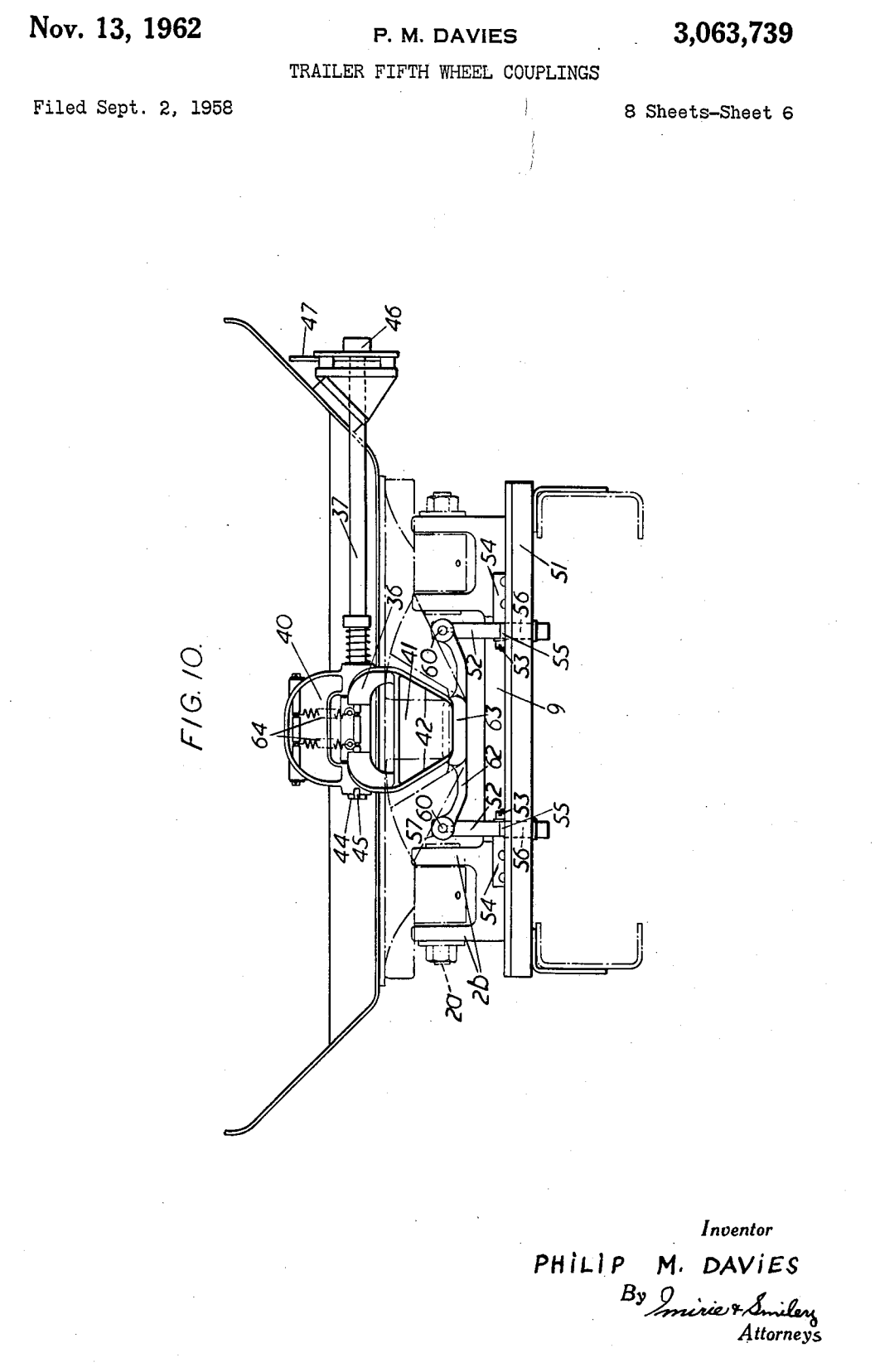

Nov. 13, 1962 P. M. DAVIES 3,063,739
TRAILER FIFTH WHEEL COUPLINGS
Filed Sept. 2, 1958 8 Sheets-Sheet 6

FIG. 10.

*Inventor*
PHILIP M. DAVIES
By Imirie & Smiley
*Attorneys*

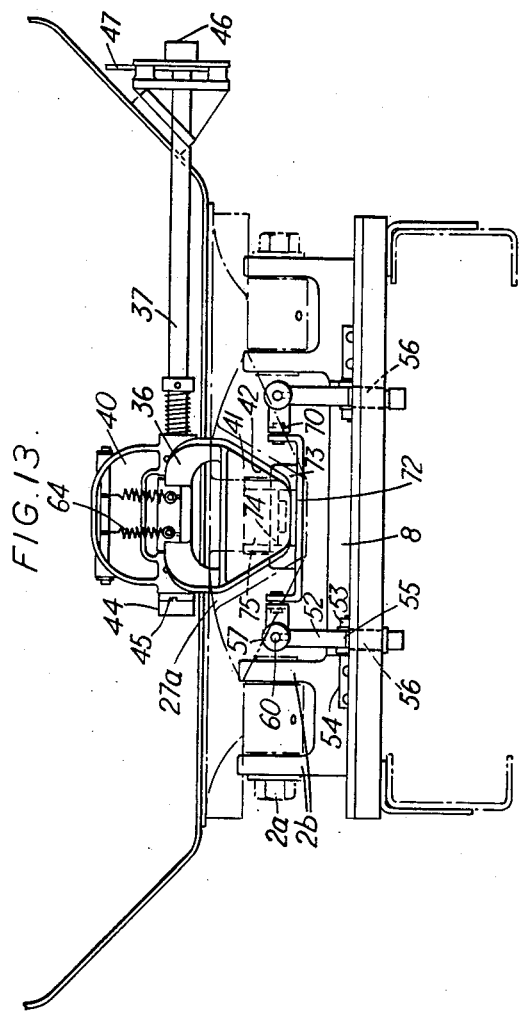

United States Patent Office 3,063,739
Patented Nov. 13, 1962

3,063,739
TRAILER FIFTH WHEEL COUPLINGS
Philip Morey Davies, Winchmore Hill, London, England, assignor to Davies Magnet Works Limited, Ware, England, a corporation of Great Britain
Filed Sept. 2, 1958, Ser. No. 758,286
Claims priority, application Great Britain Sept. 17, 1957
9 Claims. (Cl. 280—438)

This invention relates to couplings for use in coupling trailers which may be semi-trailers to tractors and more particularly to such couplings for use with tractor and trailer articulated vehicles known as fifth wheel couplings, in which the trailer has a support such as a wheel or wheels for the unbalanced load of the front end of the unhitched trailer and in which the tractor and trailer are coupled by backing the tractor towards the trailer so that a king pin carried by the trailer enters and is engaged by a coupling device rigidly secured to the tractor chassis and at the same time the front end of the trailer may be raised so that the unbalanced load of the trailer is transferred from the support to the tractor.

The conventional fifth wheel coupling device consists of a fifth wheel plate secured to the tractor chassis over the tractor rear wheel axle and pivotable in trunnions on the chassis about a horizontal axis parallel to the said axle. The fifth wheel plate has jaws therein rotatable in the horizontal plane and a rearwardly directed guideway narrowing to a slot which extends over the jaws so that when the tractor is backed towards the trailer the king pin on a plate fixed to the trailer enters the guideway and finally enters the jaws which are then rotated by an operating device to close round the king pin and then locked to clamp the king pin, so as to permit its rotation in the jaws.

In such conventional fifth wheel couplings turning of the tractor with respect to the trailer will be about the vertical axis of the king pin. Since the fifth wheel plate is fixed to the tractor chassis its centre line always remains in alignment with the longitudinal centre line of the tractor moreover the semi-trailer is unbalanced about its single road wheel axle and its heavier forward part is supported on the fifth wheel plate, so that as the vehicle travels along the road the forward trailer part will move up and down, sometimes jerkily, and this frequently becomes an oscillatory movement: however, due to this movement being on an arc having its center in the trailer road wheel axis, it will not be in the vertical plane and therefore it will be made up of vertical and horizontal components and the horizontal components of this oscillation will always be in the longitudinal trailer axis so that on the articulated vehicle turning a bend in the road the vertical components of the longitudinal oscillations will be at an angle to the longitudinal axis of the trailer and set up forces having components acting sideways of the trailer tending to turn it over on its side. Further the unbalance load of the forward end of a semi-trailer is always applied downwardly through the fixed axis of the king pin and fifth wheel plate, so that the unevenness of the road will result in sideways oscillatory swinging of the trailer about the point of contact of the king pin and the fifth wheel plate and such uncontrolled transverse oscillations occur whether or not the longitudinal axis of the tractor and trailer are in alignment. As the angle in the horizontal plane between the tractor and trailer increases, as when the articulated unit is cornering on a road for example, all said oscillatory movements increasingly have components tending to overturn the trailer thus decreasing the stability of the articulated vehicle as a whole. The outward centrifugal force on the vehicle when cornering will also tend to overturn the trailer and thus increase its instability.

Another disadvantage of the conventional fifth wheel couplings is that when the articulated unit is backed, the trailer swings with respect to the tractor and beyond a certain angle between the longitudinal axes of the tractor and the trailer the trailer does not move further backwards so that the tractor eventually turns into the trailer, which is called jack-knifing. A similar and highly dangerous effect can occur, as when descending a steep hill, when, should the rear trailer brakes not be operating efficiently, the rear of the trailer will tend to swing out of alignment with the tractor, and ultimately reach such an angle to the tractor that the trailer side is forced into the driver's cab of the tractor.

The main object of the present invention is to provide a fifth wheel coupling such that in the articulated vehicle the vertical components of the longitudinal oscillations can occur freely in a direction along the longitudinal axis of the trailer even when the longitudinal axes of the trailer and tractor are out of alignment, and that the transverse oscillations of the trailer are minimized.

Another object of the invention is to provide a coupling in which, when the articulated vehicle corners, the tendency of the trailer to overturn will be reduced.

A further object of the invention is to provide a coupling in which the degree of swing between the tractor and trailer can be limited or controlled so that jack-knifing of the articulated vehicle is avoided and reversing of the articulated vehicle is facilitated.

Yet a further and important object of the invention is to provide, in a coupling of the above described characteristics having a rotatable subframe carrying a fifth wheel plate, a pair of locking devices operatively connected to each other and operable by a driver of the tractor at his will and so constructed and arranged as to automatically function to permit the trailer to swing about the axis of the trailer king pin or about a second vertical axis displaced forwardly thereof.

Still another object of the invention is to provide a coupling construction of the above described characteristics which can be adaptable for use to modify existing fifth wheel plate constructions.

From another aspect the invention includes an articulated vehicle consisting of a tractor and a trailer, which may be a semi-trailer with or without a fifth wheel support, the tractor and trailer having a fifth wheel coupling as herein set forth and exemplified in the description with reference to the accompanying drawings.

In order that the invention may be more clearly understood some constructions of fifth wheel couplings in accordance therewith will now be described, by way of example with reference to the accompanying drawings, in which:

FIGURE 6 is a plan view of the coupling shown in FIGURE 5;

FIGURE 7 is an elevation looking from the left of FIGURE 5;

FIGURE 8 is a cross-section on the line VIII—VIII of FIGURE 9 showing another construction;

FIGURE 9 is a plan view of the coupling shown in FIGURE 8;

Figure 11:
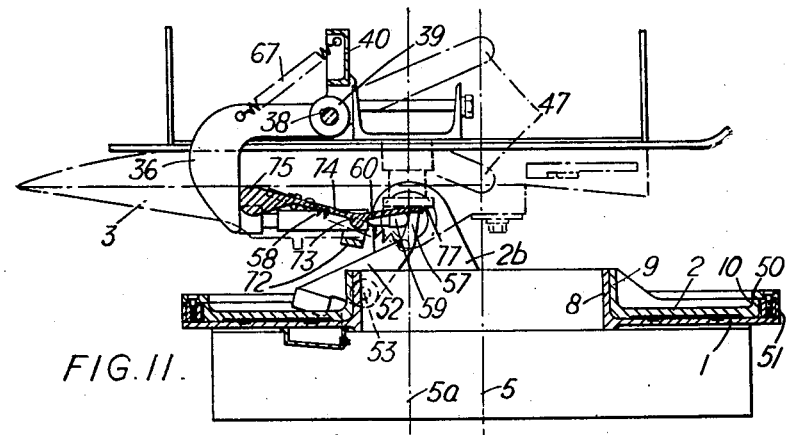
Figure 12:
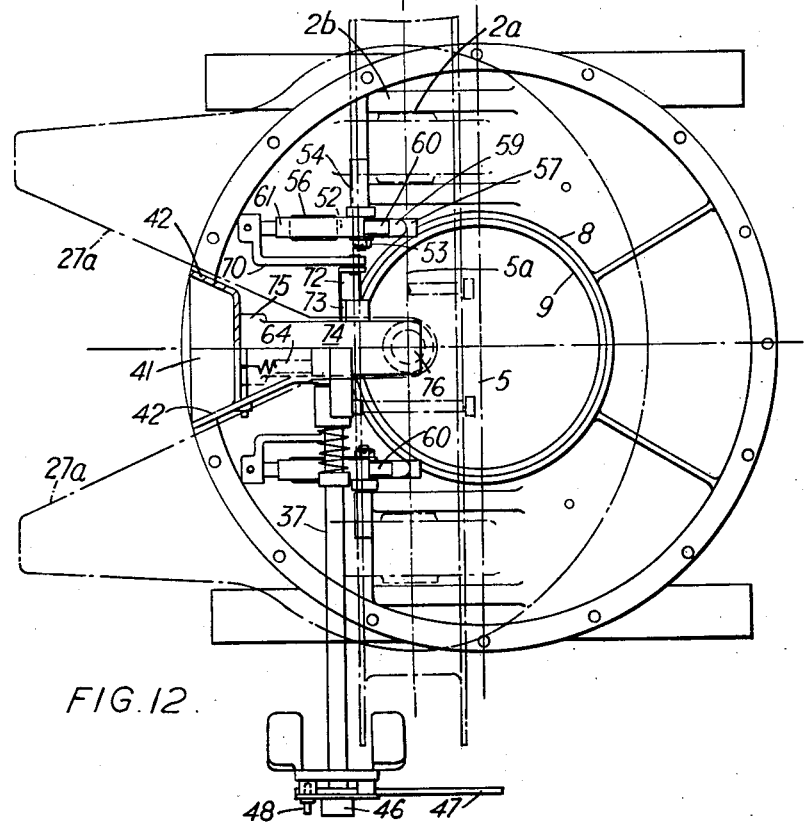

FIGURE 10 is a rear end view of the coupling shown in FIGURES 8 and 9 looking from the left in FIGURE 8; and FIGURES 11, 12 and 13 which show a modified construction similar to FIGURES 8, 9 and 10 respectively.

In the description like references are employed to designate the same or similar parts.

Figure 1:
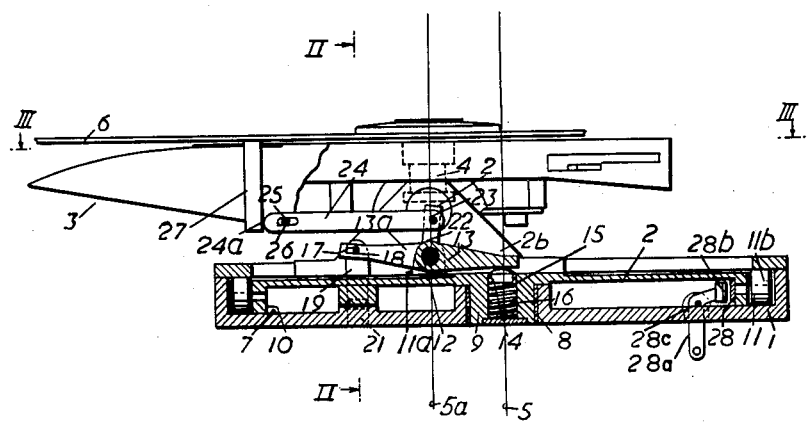
FIGURE 1 is a longitudinal view partly in cross-section of a trailer fifth wheel coupling.
Figure 2:
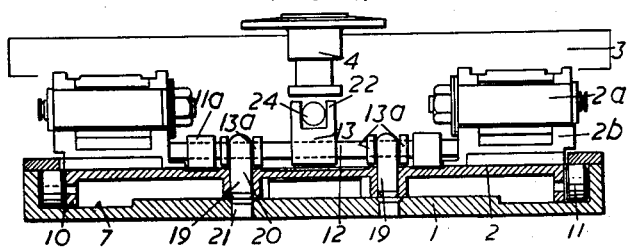
FIGURE 2 is a cross-section on the line II—II of FIGURE 1.
Figure 3:
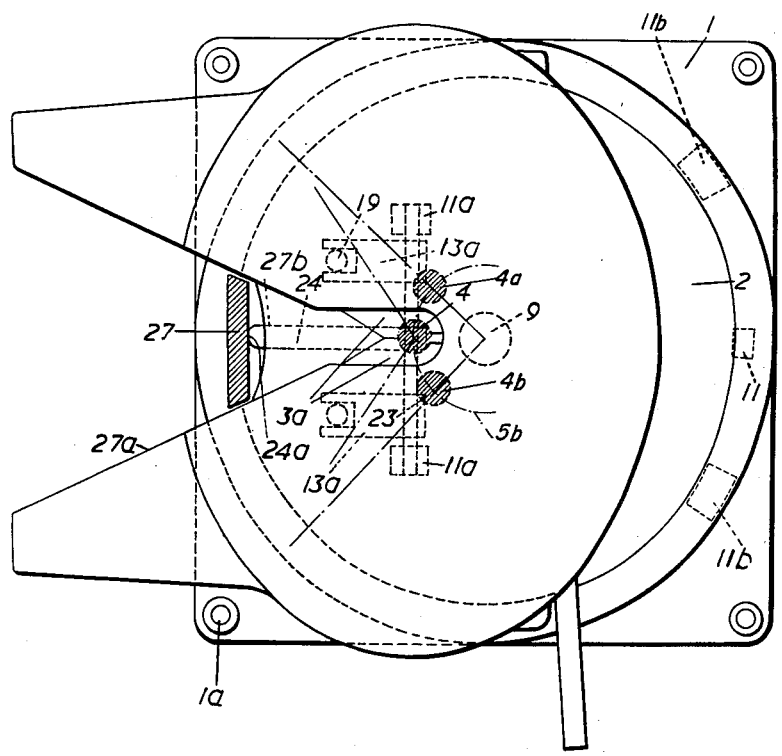
FIGURE 3 is a plan on the line III—III of FIGURE 1.

Referring to FIGURES 1 to 3 the fifth wheel coupling comprises to guide bed 1 having apertures 1a for means (not shown) such as bolts, for securing it rigidly to the frame of the tractor (not shown); a sub-frame 2 is rotatably mounted on the guide bed 1 and a fifth wheel plate 3 is mounted on the sub-frame 2 to pivot on pins 2a in bearings 2b thereon in the conventional manner about a horizontal axis which is parallel to the trailer wheel axis when the tractor and trailer are coupled with their longitudinal axes in alignment. The plate 3 carries a clamping device of known construction which forms no part of this invention but of which the jaws 3a are seen in FIGURE 3. The jaws receive and clamp the king pin 4 fixed to the trailer, but permit its rotation therein. The sub-frame 2 is rotatable with respect to the guide bed 1 in the horizontal plane about an axis 5 passing through the longitudinal axis of the tractor. The vertical axis 5a of the king pin 4 passes through the longitudinal axis of the trailer and is rearwardly spaced from the axis 5. A first locking device to be described, is provided to lock the sub-frame 2 to the guide bed 1 and a second locking device to be described, is provided to lock the sub-frame 2 to the trailer, these two locking devices being operable so that when the king pin 4 is clamped to the plate 3, i.e. on coupling the trailer to the tractor, the trailer can swing in the horizontal direction with respect to the tractor about the axis 5 or the axis 5a. The king pin 4 is mounted on a bolster plate 6 fixed to the trailer in a conventional manner.

The guide bed 1 is provided with an annular recess 7 having a central bearing 8 in which a hub 9 on the sub-frame 2 is rotatably disposed. The sub-frame 2 is circular in plan and has an outer flange 10 carrying rollers 11 which run within the outer periphery of the bed 1. The first locking device will now be described. Mounted on the sub-frame 2 are bearing lugs 11a in which is journalled a cross-shaft 12 carrying a fore and aft lever 13. The forward end of the lever 13 engages a plunger 14 slidable in a boring 15 in the hub 9 and urged upwardly by a spring 16 therein; the lever 13 has two rearwardly extending arms 13a each of which is bifurcated at the end with slots 17 with which engage pins 18 each carrying a bolt 19 slidable in a boring 20 in the sub-frame, such that when the sub-frame is centrally disposed with respect to the bed 1, the bolts will be urged by the spring 16 to enter slots 21 in the guide bed 1, thus locking the sub-frame to the guide bed. On top of the lever 13 and integral therewith are two arms 22 carrying a pin 23 on which is pivoted a link 24; the free end of the link 24 has a slot 25 in which a pin 26 slidably engages, said pin being fixed to the fifth wheel plate 3, thereby limiting the movement of the outer end of the link 24.

The second locking device comprises a retractable member shown in FIGURES 1 to 3 as a tongue 27 movable at the will of the driver and pivotally or slidably disposed on the bolster plate 6 so that in one position shown in FIGURE 1, it engages the nose 24a on the lever 24 and in the other position it is clear of the nose. When in the former position the tongue 27 enters and engages the ramps or sides 27a of a guideway 27b or slot in the plate 3 through which the king pin slides to engage the jaws 3a when coupling the trailer to the tractor, thus locking the plate 3 to the trailer in a central position with respect to the longitudinal axis of the tractor.

When it is desired to free the sub-frame 2 from the bed 1 the tongue 27 is positioned out of contact with the nose 24a when the link 24 travels to the left in FIGURE 1 under the action of the spring 16 such that the bolts 19 will enter the slots 21 when aligned therewith; to release the sub-frame from the bed 1, the tongue 27 is projected into the path of the link 24 which is thus forced to the right in FIGURE 1 against the action of the spring 16, thereby raising the bolt 19. This locking and unlocking of the sub-frame is effected with the sub-frame centrally disposed with respect to the bed 1.

In FIGURES 1 and 3 it will be seen that the tongue 27 in the position shown is located between the guide faces 27a, bounding the mouth of the slot 27b in the plate 3 so that the plates 3 and 6 are locked against rotation while, the bolts 19 being raised, the sub-frame 2 is free to rotate on the bed 1. When however the tongue 27 is moved out of the slot 21, the sub-frame is locked to the bed 1.

In operation when the trailer is to be coupled to the tractor the plate 3 must be secured against rotation and this is achieved by locking the sub-frame to the bed 1 as herein described. The tractor is then backed towards the trailer so that the king pin is guided into the slot 27b until it is engaged and pivotally clamped in the jaws 3a. In this position the trailer may be towed and when the articulated vehicle corners the trailer swings about the axis 5a i.e. the coupling acts in the conventional manner except that its downward load on the tractor is centered along the axis 5a but distributed by the outer bearing surface i.e. the rollers 11 over the area of the bed 1; this will assist in counter-acting the outward centrifugal force on cornering since more load is transmitted on the inner area of the bed 1 than on the outer area. The longitudinal oscillations from the pins 2a will be applied at all times along the longitudinal tractor axis.

If however on coupling the tongue 27 is lowered to engage the nose 24a the sub-frame will be unlocked from the bed 1 and locked to the trailer as described above. Thus on towing the trailer load will still be applied along the axis 5a but the trailer will swing on corners about the axis 5 and the axis 5a will move on the circle 5b (FIGURE 2) so that the king pin 4 will occupy positions such as 4a or 4b in FIGURE 3. The plate 3 is free to swing about the horizontal axis of rotation of the pins 2a and since the trailer is unbalanced about its road wheels at its rear end, as the articulated vehicle travels, the front part of the trailer carrying the king pin will oscillate in a generally vertical direction but about the trailer road wheels, axis of rotation and thus creates a component force in a horizontal direction causing oscillation through the king pin perpendicular to the axis of the pins 2a. If the trailer is not in longitudinal alignment with the tractor and has rotated on the axis 5a these horizontal oscillations will continue fore and aft of the tractor i.e. perpendicular to the axis of pins 2a. Where however the plate 3 is locked to the bolster plate 6 to swing with the trailer about the axis 5 the pins 2a will also swing with the sub-frame 2 and then the longitudinal oscillation will be perpendicular to the axis of the pins 2a and through the axes 5a and 5 i.e. in the longitudinal axis of the trailer, thus eliminating any component of these oscillations tending to turn the trailer on its side. Moreover, the downwardly acting unbalanced trailer load acting through the king pin will move inwardly on cornering thus assisting in the stability of the articulated vehicle against the trailer overturning. Further since the sub-frame can be locked to the plate 6 or the bed 1 at the will of the driver, the trailer can at will of the driver be made to swing about the axis 5 as in conventional couplings or about the axis 5a.

From FIGURES 1 and 2 it will be seen that the rollers 11 on the sub-frame run in a channel 11b at the periphery of the bed 2 and stops 11b may be provided in this channel to limit the sub-frame arc of turning of the sub-frame in the bed 1 to avoid jack-knifing either when reversing or when descending steep hills for example, thus rendering the articulated vehicle safer to drive. As an alternative or in addition to the stops 11b, means may be provided to break the rotation of the sub-frame 2 in the bed 1; for this purpose the sub-frame has friction surface 28 (FIGURE 1) and a lever 28a carrying a friction head 28b is pivoted at 28c to the bed 1 so that when the lever 28a is operated, as by a cable for example from a control in the tractor driver's cab, the head 28b will engage the surface 28 to break or arrest rotation of the sub-frame. The surface 28 extends round the sub-frame rim and a number of heads 28b or like members may be employed which may be constructed in any other suitable manner, for example like a conventional expanding brake on a motor road vehicle.

Figure 4:
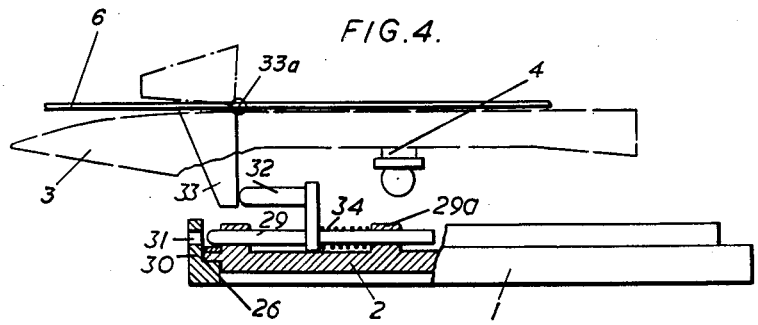
FIGURE 4 is a view similar to FIGURE 1 but showing only part of a modified construction.

Referring to FIGURE 4, on the construction of the guide bed 1, the sub-frame 2, the fifth wheel plate 3, and the bolster plate 6, as well as the king pin 4 and other details of construction is similar to that shown in FIGURES 1 to 3 with the exception of the hereinafter mentioned details in FIGURE 4; the sub-frame 2 carries a rod 29 slidably mounted in bearings 29a fixed to the sub-frame. The guide bed 1 carries an upstanding portion 30 having, in the longitudinal axis of the tractor, a boring 31 with which the rod 29 engages to lock the sub-frame in its central position with respect to the bed.

The rod 29 carries a plunger 32 disposed above the rod 29 and of a length which, when engaged by the second locking device in the form of a retractable block 33, will be forced against the action of a spring 34 to unlock the sub-frame from the guide bed.

The block 33 is pivoted to the plate 6 and can be swung out of the path of the plunger 32 or lowered into said path at the will of the operator.

The second locking device, i.e. the tongue 27 or the block 33 is preferably mounted on the plate 6, as by being pivoted at or slidable thereon to be retractable into the plate 6, but it may be a separate member disposed by the driver in the locking position of FIGURES 1 and 4 when the sub-frame is to be unlocked from the bed.

Figure 5:
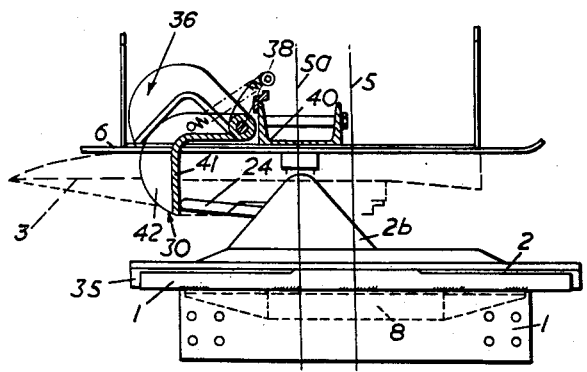
FIGURE 5 is a view similar to FIGURE 1 of another construction of a trailer fifth wheel coupling.

Referring to FIGURES 5 to 7 these show another construction similar to those described with reference to FIGURES 1 to 3 or FIGURE 4, but the sub-frame 2 and bed 1 as well as the second locking device are of different construction, the first locking member being as in FIGURES 1 to 3 or in FIGURE 4, of which only the lever 24 is shown.

The sub-frame 2 is of larger diameter than the guide bed 1 and has a downwardly depending annular flange 35 which engages round the periphery of the bed 1. Where stops are provided these may be on the flange 35 engaging in cut-away portions of the periphery of the bed 1, and an internal expanding brake may be provided and actuated similar to that in FIGURE 1 to be expanded to engage parts of the inner surface of the flange 35.

The second locking device consists of a claw 36 secured by a key 37 to a shaft 38 rotatably mounted in bearings 39 in turn fixed to a transverse channel member 40 fixed on the plate 6. The claw 36 has a central tongue 41 and wings 42 shaped to engage the ramps or sides 27a of the slot 27 in the fifth wheel plate 3. In its lowered position the claw 36 clamps the sub-frame, by the plate 3, to the plate 6 and displaces the lever 24 to unlock the sub-frame from the guide bed 1. The shaft 38 is slidable longitudinally in the bearings 39 and is urged by a spring 43 to cause a dog clutch 44 fast on its end to engage teeth 45 fixed to one of the bearings. The other end of the shaft 38 is extended beyond the coupling and supported in a bearing 46 fixed to the trailer chassis. A lever 47 is fixed on the outer end of the shaft 38 by which the claw can be moved into and out of the locking position and clamped in either position by sliding to engage the dog clutch 44 in the teeth 45. A removable pin 48 may be provided passing through holes (not shown) in register which extend through the plate 48a fixed on the shaft 38 and a lug 48b fixed with respect to the bearing 46 to form an additional lock of the lever 47 in either position. The channel member 40 is shaped to allow the top of the king pin to pass beneath as shown in FIGURE 6.

It will be seen from the drawings that, since the claw 36 can as and when required be retracted easily into the body of the trailer so that only the king pin is left projecting, the coupling is then suitable for connection to a standard type of fifth wheel, when swinging movement between the tractor and the semi-trailer would be of the conventional standard type by means of the king pin rotating in the locking jaws.

Referring to FIGURES 8 to 10 these show an alternative construction having the second locking means, namely the retractable claws 36 similar to that shown in the construction of FIGURES 5 to 7.

In FIGURES 8 to 10 the guide bed 1, for fixing to the tractor is similar to those in FIGURES 1 to 4 but has an annular friction surface 50 on the inner wall of its outer flange 51 while the sub-frame 2 has conventional means (not shown) such as an expanding brake shoe or shoes for frictional engagement with the surface 50 to brake or halt the rotation of the sub-frame in the guide bed. Further the guide bed has a central bearing in the form of a boss 8 of large diameter on which a hub 9 is slidably located, the large diameter of the boss and hub tending to reduce wear between them and avoid undesirable looseness of this bearing.

The first locking means comprises two spaced latches 52, each pivotally mounted on a pin 53 fixed by brackets 54 to the sub-frame 2, each latch being provided with a nose 55 which, when the sub-frame is centrally disposed with respect to the longitudinal axis of the tractor and guide bed 1, engages in a slot 56 in the guide bed. The upper end of each latch 52 has a toe 57 urged by a resilient member such as a spring 58 (FIGURE 8) or a block to engage a nose 59 on a rod 60 longitudinally slidable in a bracket 61 secured to the sub-frame 2. The rear ends of the rods 60 are interconnected by a cross-bow 62 having a bearing face 63 engageable by the claw 36 when lowered as in FIGURES 8 to 10. Thus when the claw 36 is lowered to engage the guide faces 27a locking the trailer to the fifth wheel plate 3, the lower end of the tongue 41 of the claw forces the cross-bow 62 to the front and the rods 60 engaging the toes 57 pivot the latches 52 against the action of the springs 58 so that their noses 55 are disengaged from the slots 56 thereby freeing the sub-frame for pivotal swinging movement about the guide bed 1. A resilient member such as a spring or springs 64 normally urges upwards the claw 37 of the second locking means in the same manner as shown in FIGURES 5 to 7, and the rod 37 has a dog clutch 44, 45 normally urged into engagement by the spring 43, the pin 48, bearing 46 and lever 47 being similar to the parts of the same numerals in FIGURES 5 to 7.

It will be seen that in all the constructions shown in the drawings which exemplify this invention the first and second locking means enable the rotatable sub-frame which carries the coupling jaws to be freed for longitudinal oscillation with respect to the tractor or to be fixed longitudinally to the tractor according to the disposition of the two locking means. Further any trailer including semi-trailers carrying a rotatable locking means such as the claw 36 may be coupled to a conventional fifth wheel coupling in the normal way; likewise a coupling according to the invention may be attached to a conventional semi-trailer or trailer fifth wheel king pin without a locking tongue so that the two would then be coupled in the conventional manner of a fifth wheel coupling i.e. the coupling enables the trailer to pivot with respect to the tractor about the king pin axis 5a.

In addition the provision of a brake means between the guide bed and the sub-frame enables the degree and ease of movement between tractor and trailer to be controlled by the tractor driver and thus limiting the jack-knifing tendency between tractor and trailer.

It will be seen that should the second locking means be inadvertently unlocked or otherwise fail to lock the trailer to the fifth wheel plate 3 thus releasing the first locking means, the coupling would automatically operate as a conventional fifth wheel coupling i.e. pivoting about the king pin axis 5a.

By reason of the larger diameter of the bearing surfaces between the guide bed and the sub-frame, the portion of the trailer weight transmitted to the tractor will be spread over a large area thereby reducing thet endency of the trailer to overturn during travel.

In the construction shown in FIGURES 8 to 10, it can occur in certain tractor trailer constructions that in the locked position a greater overlap of the claw 36 on the cross-bow 62 is necessary; the bow 62 is shaped as shown in FIGURES 8 to 11 to permit the king pin to pass over it on coupling up. To provide the greater overlap of the claw on the member which the claw engages to unlock the sub-frame from the bed, the modification of the construction of FIGURES 8 to 10 shown in FIGURES 11 to 13, has been provided. In this modification, the cross-bow 62 is omitted and the front ends of the rods 60 are connected to two L-shaped rods 70, extending parallel to the rods 60, and having pivoted to their ends 71 a bridge 72 to which a latch 74 is pivoted by stubs 73; the rear end of the latch 74 has a bulbous part 75 and the forward end has an upwardly inclined blade 76. In coupling up the trailer to the tractor, the claw 36 is raised, the latch 52 is lowered to lock the sub-frame to the guide bed and thus the blade 76 is raised and the part 75 being heavier than the blade 76 is lowered by gravity; as the king pin is moved in to the clamping position its lowered face 77 passes over and clear of the part 75, and then engages the blade 76 depressing it to the position shown in FIGURE 11, so that the bulbous part 75 is raised to be fully engaged by the claw 36 but not sufficiently to move the latch 52 far enough to unlock the sub-frame from the bed. When the claw 36 is lowered, it engages the part 75 and forces it forwards to cause the rods 60 to slide further forward in engagement with the toes 57 of the latch 52 to move them into fully unlocked position of the sub-frame with respect to the bed. It will thus be seen that the part 75 engages the claw 36 in a secure manner and is held in that position by permanent engagement of the blade 76 by the king pin.

I claim:

1. A fifth wheel coupling for coupling a trailer having a bolster plate to a tractor, comprising a guide bed for rigid connection to the tractor, a sub-frame mounted on the guide bed so as to be rotatable with respect thereto about a first vertical axis passing through the longitudinal axis of the tractor, a fifth wheel plate mounted on the sub-frame so as to pivot with respect thereto about a horizontal axis, said plate incorporating means for rotatably clamping a trailer king pin in a second vertical axis perpendicular to said horizontal axis and spaced rearwardly from said first vertical axis, a first locking device for locking the sub-frame in its central position against rotation wtih respect to the guide bed, a second locking device movably mounted on one of said bolster and fifth wheel plates, a locking recess in the other of said plates, said second locking device being movable into said recess for locking the sub-frame in its central position against rotation with respect to the trailer, said second locking device being operable by a driver of the tractor at will, and linkage operatively interconnecting said first and second locking devices including a lever element in the path of locking of the second locking device adapted to be engaged thereby so that with the king pin pivotally clamped to the said fifth wheel plate, operation of said second locking device to lock the sub-frame to the trailer will automatically release the first locking device and permit the trailer to swing with respect to the tractor about said first vertical axes, while operation of said second locking device to release the sub-frame will automatically lock the first locking device and permit the trailer to swing with respect to the tractor about said second vertical axis.

2. A fifth wheel coupling according to claim 1, wherein said first locking device comprises a bolt slidably disposed in guides on the sub-frame and a resilient member urging an end portion of the bolt into a slot on the guide bed, said bolt being further provided with an arm disposed to be displaced by the second locking device against the action of the resilient member when the second locking device is moved into the path of said arm.

3. A fifth wheel coupling for coupling a trailer having a bolster plate and king pin mounted thereon to a tractor, comprising a guide bed for rigid connection to the tractor, a sub-frame mounted on the guide bed so as to be rotatable with respect thereto about a first vertical axis passing through the longitudinal axis of the tractor, a fifth wheel plate having a locking recess and mounted on the sub-frame so as to pivot with respect thereto about a horizontal axis, said fifth wheel plate incorporating means for rotatably clamping the trailer king pin in a second vertical axis perpendicular to said horizontal axis and spaced rearwardly from said first vertical axis, a first locking device for locking the sub-frame in its central position against rotation with respect to the guide bed, and a second locking device movably mounted on the bolster plate to engage the fifth wheel plate in said recess for locking the sub-frame in its central position against rotation with respect to the trailer, said first locking device including a first member movable in the sub-frame and operatively associated with a second member movable so as to be disposed in the path of the second locking device when the first locking device is in its locked position, and a resilient member urging said members to the locked position, so that operation of said second locking device to lock the sub-frame to the trailer will automatically release the first locking device and permit the trailer to swing with respect to the tractor about said first vertical axes, while operation of said second locking device to release the sub-frame will automatically lock the first locking device and permit the trailer to swing with respect to the tractor about said second vertical axis.

4. A fifth wheel coupling according to claim 3, wherein the first locking device comprises at least one bolt engageable in a slot in the guide bed and mounted on a lever pivoted on the sub-frame and urged by resilient means to engage the bolt in one of said slots, and a rod pivoted to said lever and slidable in the sub-frame so that in the locking position it will be disposed in the path of the second locking member.

5. A fifth wheel coupling according to claim 4, wherein the first locking device comprises a number of bolts each secured to the lever and the lever is spring urged into the locking position.

6. A fifth wheel coupling according to claim 1, wherein the first locking means comprises at least one lever pivoted to the sub-frame about a horizontal axis, at least one locking bolt secured to one end of the lever, the other end of the lever on the opposite side of the pivot thereof having a portion in engagement with a member housed in a boring in the sub-frame and urged by a resilient device to cause the lever to maintain the bolt in the locking position.

7. A fifth wheel coupling according to claim 1, wherein the first locking means comprises at least one lever pivoted to the sub-frame about a horizontal axis, at least one locking bolt secured to one end of the lever the other end of the lever on the opposite side of the pivot thereof having a portion in engagement with a member housed in a boring in the sub-frame and urged by a resilient device to cause each lever to maintain each bolt in the locking position, the lever engaging the end of a rod slidably disposed with respect to the sub-frame and carrying as said lever element a cross-bow disposed in the path of the locking member of the second locking device to be disposed thereby to unlock the first locking device when the second locking device is locked.

8. A fifth wheel coupling according to claim 1, wherein the locking device for securing the sub-frame to the guide bed has a member pivotally mounted on the sub-frame, said member being normally urged into the locking position and into engagement with a movable member to which a latch is pivoted, said latch having a blade disposed in the path of the trailer king pin and a part forming said lever element in longitudinal alignment with the locking device for securing the bolster plate to the sub-frame, so that on coupling the trailer to the tractor, the king pin displaces the blade and locates said latch part in the path of the locking movement of said second locking device which on being moved to locking position displaces the latch to unlock the sub-frame from the guide bed and to lock the bolster to the sub-frame.

9. A fifth wheel coupling according to claim 1, wherein the second locking device comprises a retractable member pivoted to the trailer bolster plate about a transverse axis thereof and has a claw portion shaped so that in a lowered locking position the claw portion will engage and displace said lever element operatively connected to the first locking device to unlock the same and to permit swinging of the trailer about the axis of rotation of the sub-frame and when the claw portion is raised out of connection with the said member the sub-frame will be locked to the guide bed and permit the trailer to swing about the axis rotation of the king pin.

References Cited in the file of this patent

UNITED STATES PATENTS

| | | |
|---|---|---|
| 1,441,293 | Seyferth | May 11, 1948 |
| 2,567,312 | Apgar | Sept. 11, 1951 |
| 2,667,364 | Colpo | Jan. 26, 1954 |
| 2,681,236 | Apgar | June 15, 1954 |
| 2,712,948 | Conaway | July 12, 1955 |
| 2,773,701 | Safko | Dec. 11, 1956 |
| 2,843,398 | Apgar | July 15, 1958 |